United States Patent Office 2,794,580
Patented June 4, 1957

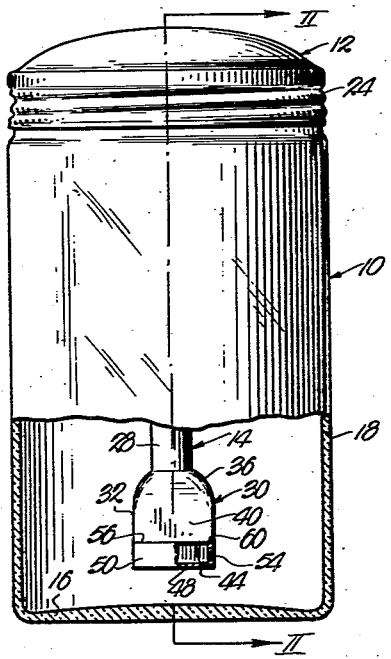
Fig. 1.
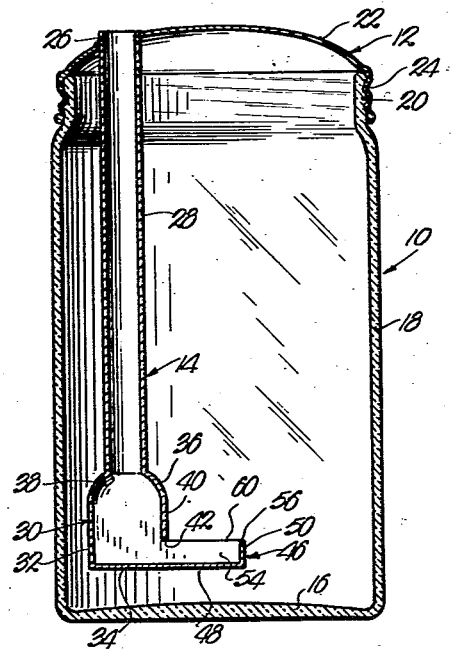
Fig. 2.
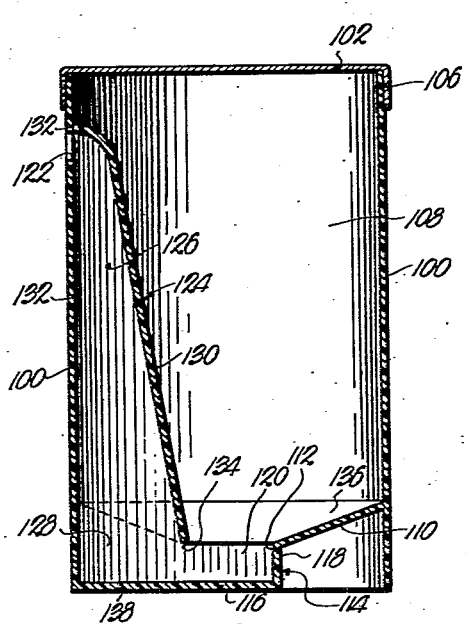
Fig. 4.
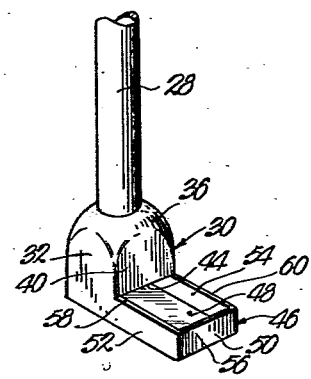
Fig. 3.
INVENTOR.
Ace E. King
ATTORNEY.

2,794,580

DISPENSER FOR GRANULAR MATERIALS

Ace E. King, Kansas City, Mo.

Application April 16, 1954, Serial No. 423,708

1 Claim. (Cl. 222—456)

This invention relates to dispensing containers and, more specifically, to improved dispensers adapted for accurately measuring a predetermined quantity of material from the supply of material within the dispenser and then delivering said measured quantity exteriorly of the dispenser.

The dispensers contemplated and provided by this invention are adapted for use with any kind of divided material normally existing as solid particles, grains, pellets, pieces or the like, as well as aggregates or mixtures thereof. Thus, the invention is adapted for use not only in connection with various domestic supplies such as sugar, salt, flour, coffee, tea, soaps, detergents and the like, but also with various chemicals, raw materials and other substances as used in industry. It is, therefore, to be understood that any references made in the following description and claim to "granular material" or the like is to be broadly construed as including, without limitation, all of the general class of materials above described, the terminology being used merely to distinguish from materials in a liquid, or undivided solid state.

Many attempts have been made in the prior art to provide satisfactory measuring dispensers. However, all of same have been subject to various disadvantages such as inaccuracy of measurement, clogging or general impracticality of the structure provided resulting in unreasonable manufacturing costs, lack of adaptability for assembly line, fabrication, assembly or filling, and other serious difficulties which, it may be observed, have heretofore rendered such devices unpopular.

It is the primary object of this invention to provide dispensers for granular material which avoid and overcome the above-noted disadvantages inherent in previous devices of the same general class.

It is another important object of this invention to provide such dispensers of simple construction and low cost, but yet capable of attaining improved accuracy of measurement and positiveness of delivery.

It is an important object of one embodiment of this invention to provide a refillable dispenser particularly adapted for use with materials having a tendency to form into lumps or the like under the influence of humidity or other conditions, such as sugar, which dispenser, by virtue of its structural configuration, will avoid clogging caused by such lumps as commonly occurs in conventional dispensers.

It is an important object of another embodiment of this invention to provide a disposable, combination container and dispenser for use in packaging and selling a granular material, which dispenser, by virtue of its construction, may be used by the purchaser in dispensing measured quantities of the material as required until the material is completely exhausted and then simply throw away the dispenser.

Other important objects of this invention, including important details of construction will become clear or be made apparent as the following description of the invention progresses. In the accompanying drawing:

Figure 1 is a view, partially in side elevation and partially in section with parts broken away for clarity of illustration, of one embodiment of dispenser made in accordance with the principles of this invention;

Fig. 2 is a cross sectional view of the dispenser illustrated in Fig. 1 taken on line II—II of Fig. 1;

Fig. 3 is a fragmentary perspective view of the measuring tray, hopper and conduit structure of the dispenser illustrated in Figs. 1 and 2; and Fig. 4 is a cross sectional view similar to that of Fig. 2 illustrating another embodiment of dispenser made in accordance with this invention.

Referring first to Figs. 1, 2 and 3, the dispenser illustrated broadly includes an open topped container 10 having removable top covering means 12 and measuring and dispensing structure broadly designated 14.

Container 10 is preferably, although not necessarily, formed of glass or plastic and includes a bottom 16 and a cylindrical side wall 18. Side wall 18 is provided adjacent its open end with external threads 20. Covering structure 12 comprises a cap 22 preferably, although not necessarily, formed of metal and provided with internal threads 24 adapted to screw upon threads 20 of side wall 18. Cap 22 is provided with a material egress or delivery perforation 26, which is preferably located approximate to a normally lateral edge of cap 22.

Measuring and dispensing structure 14 includes a normally upright, elongated, tubular material conduit 28 having its upper extremity in communication with perforation 26 of cap 22. Conduit 28 is rigidly attached to cap 22 in any suitable fashion and depends therefrom within the confines of side wall 18 of container 10. A hopper generally designated with the numeral 30 includes lateral wall structure 32 and a bottom wall 34. An upper portion 36 of lateral wall structure 32 is inwardly tapered and interconnected with the lower extremity of conduit 28, upper portion 36 being provided with a hole 38 communicating with the lower extremity of conduit 28. The lower portion of that side 40 of lateral wall structure 32 nearest the access of container wall 18 is provided with a material ingress opening as at 42. That part of side 40 overlying opening 42 preferably terminates at its lowermost extremity in a straight, normally horizontal edge 44 defining the top of opening 42.

A material receiving tray broadly designated by the numeral 46 extends laterally from side 40 of lateral wall structure 32 of hopper 30. Tray 46 includes a bottom wall 48 preferably integrally formed with bottom 34 of hopper 30, an upstanding end wall 50 and a pair of opposed side walls 52 and 54 preferably formed integrally with the corresponding sides of lateral wall structure 32 of hopper 30.

It is significant that the lateral cross sectional area of hopper 30 is greater than the transverse cross sectional area of conduit 28 in order to provide more even delivery of material to conduit 28 and thus the exterior of container 10, that the top edges 56, 58 and 60 of walls 50, 52 and 54 respectively of tray 46 are preferably normally horizontal and each on a level substantially with the lowermost edge 44 of side 40 of hopper 30 in order to permit side 40 to act as a baffle preventing introduction into hopper 30 of more than the predetermined, measured quantity of material, and that the volume of that portion of hopper 30 normally disposed above the level of edge 44 is as great and preferably greater than the combined volumes of that portion of hopper 30 normally below the level of edge 44 and the tray 46 in order to permit full and immediate delivery of the measured quantity of material into hopper 30 when container 10 is tipped during operation.

The above described construction is important in dispensers for use with material such as sugar which tends to in part form into lumps under the influence of humidity or other conditions. It is well known that the larger particles of a granular material tend to collect adjacent the upper surface of a body of such material when the latter is subjected to agitation. Accordingly, as container 10 is tipped during operation, as will hereinafter be more fully explained, the material within container 10 is agitated and any lumps that may be present therein tend to gather at the surface of such material. It is, therefore, clear that clogging due to lumps entering tray 46 is avoided by disposing tray 46 well below the surface of the normal level of material to be maintained in container 10. It will be evident that, in operation, with the level of material in container 10 disposed above edges 56, 58 and 60 of tray 46, tray 46 and that portion of hopper 30 below the level of edge 44 will be filled with the material. Obviously, the size of tray 46 may be varied to provide for thus measuring any desired, predetermined quantity of material. It will be seen that, whenever the dispenser is in its normal material storing position as illustrated in Figs. 1 and 2, the tray 46 and above-mentioned lower portion of hopper 30 will remain in filled condition. To dispense the measured quantity of material, the container is tilted through an obtuse arc of swinging movement to move perforation 26 downwardly and to the left and to move tray 46 upwardly and to the right as illustrated in Fig. 2. As container 10 is thus tilted, the quantity of material previously measured into tray 46 and the lower portion of hopper 32 will be delivered into the remainder of hopper 30 and thence through hole 28 into conduit 28 through which it passes and is delivered through perforation 26. It is important to note that as such tipping action takes place side 40 of hopper 30 acts as a baffle to prevent material in addition to that previously measured into tray 46 and the lower portion of hopper 30 from entering either of the latter. Thus, an accurate measurement of the material to be delivered is assured.

It will be clear that as the material in container 10 is exhausted to a point disposing the level of its surface too low for satisfactory operation of the dispenser, cap 22 carrying with it the dispensing structure 14 may be easily removed from the main container body 10 to permit refilling, whereupon cap 22 and structure 14 may be replaced to render the dispenser ready for further operation.

Conduit 28, hopper 30 and tray 46 may be formed of any suitable material or materials, either metal or plastic having been found quite satisfactory with the latter slightly preferred because of decreased manufacturing costs. When formed of plastic, it is clear that structure 14 may comprise a unitary, integrally formed assembly as illustrated.

Referring now to the embodiment of the invention illustrated in Fig. 4, it will be clear that such form is particularly adapted for use in connection with the original packaging of granular materials for sale in a container which may be later used by the purchaser for dispensing, in measured quantities, the entire amount of material initially packed by the manufacturer in the container. The structure of this form of the invention is preferably formed of material such as plastic, cardboard or the like, which, because of their low cost, render the dispenser expendable so that it may be thrown away after the material has been exhausted therefrom.

More specifically, the dispenser illustrated in Fig. 4 includes a preferably, although not necessarily, cylindrical side wall 100 having its lowermost extremity closed by structure hereinafter to be described, and its upper extremity closed by a cap 102 which may be adhesively fixed in place as at 106 after filling of the container chamber 108 presented by side wall 100 with material. Adjacent the lower extremity of side wall 100 is provided a substantially frusto-conical wall 110 having an opening 112 therein. A tray assembly broadly designated by the numeral 114 having a bottom wall 116, an end wall 118 and a pair of opposed side walls 120 underlies opening 112 with side walls 120 and end wall 118 preferably forming an integral extension of frusto-conical wall 110, as will be clear from the drawing.

Container wall 100 is provided with a material egress or delivery perforation 122. Communicating with perforation 122 and extending downwardly therefrom is chute structure broadly designated 124 and having an upper conduit portion 126 and a lower hopper portion 128. Chute 124 is preferably formed by a wall member 130 of arcuate cross section interconnected along its longitudinal edges as at 132 with side wall 100, whereby the latter serves to define a portion of the chute wall. The lower extremity 134 of wall 130 interconnects with upper face 136 of frusto-conical wall 110, the latter being cut away to place conduit portion 126 of chute 124 in communication with hopper portion 128 thereof and tray 114. It will be clear, therefore, that frusto-conical wall 110 and end wall 118, bottom wall 116 and side walls 120 of tray 114, along with an extension 138 of wall 116 underlying hopper 128, constitute the closure for the normally lowermost extremity of container 100.

Further details of construction of this form of the invention will be obvious from the drawing when considered in connection with the principles above described in connection with the other embodiment of the invention. The operation of the dispenser of Fig. 4, as well as the structural interrelationships which render such operation possible, are the same as that described for the embodiment of Figs. 1, 2 and 3, except that, by virtue of the provision of frusto-conical wall 110 with tray 114 underlying opening 112 of wall 110 it will be clear that all of the material packed within container enterior 108 will ultimately be dispensable through opening 122. As with the other form of the invention, the portion of chute wall 130 directly underlying edge 134 acts as a baffle to prevent the entry of more than the desired, measured quantity of material into hopper 128 when the dispenser is tipped through an obtuse arc in a direction moving perforation 122 downwardly and to the left as illustrated in Fig. 4.

It will be clear that either the upper extremity of conduit 28 of the form of the invention shown in Figs. 1, 2 and 3 or perforation 122 of the embodiment shown in Fig. 4, may be provided with temporary or permanent covering means of conventional design, if same should be required either for reasons of sanitation or to aid in storage of material within the dispenser without deterioration.

It will be obvious to those skilled in the art, that the embodiments of the invention shown and described are in certain respects merely illustrative and that certain minor modifications and changes could be made in the exact structure disclosed without materially departing from the true spirit or intention of this invention. Accordingly, it is to be understood that this invention shall be deemed limited only by the scope of the appended claim.

Having thus described the invention, what is claimed as new and desired to be secured by Letters Patent is:

A material dispenser comprising a container having a normally upright, cylindrical side wall, a removable cap normally closing the container at the upper end of the side wall, and a frusto-conical partition partially closing the container adjacent the lower end of the side wall, said partition having a circular opening therein at its lowermost extremity, the lowermost extremity of the partition being spaced above the plane of the lower end of the side wall, a segment of the partition extending from said opening generally radially outwardly to the perimeter of the partition being cut away, there being a material egress perforation in the side wall adjacent the upper end thereof and substantially over said cut-away segment of the partition; a bottom wall in said plane extending from the side wall successively under said cut-away segment and said opening; a normally upright end wall interconnecting the partition adjacent the opening therein with the bottom wall and extending between spaced zones of the side wall to present a hopper underlying the opening and the segment; and a chute presenting, elongated wall member of arcuate, transverse cross section having its longitudinal margins connected with the side wall, its lower margin connected with the partition in bounding relation to the segment, and its upper margin connected with the side wall above the perforation.

References Cited in the file of this patent

UNITED STATES PATENTS

| | | |
|---|---|---|
| 1,155,323 | McBroom | Sept. 28, 1915 |
| 1,498,491 | Stinson et al. | June 17, 1924 |
| 2,423,784 | Mackey | July 8, 1947 |
| 2,692,708 | Frey | Oct. 26, 1954 |

FOREIGN PATENTS

| | | |
|---|---|---|
| 478,147 | Italy | Feb. 17, 1953 |